United States Patent
Tuli

(10) Patent No.: US 10,929,336 B2
(45) Date of Patent: Feb. 23, 2021

(54) METHODS, APPARATUSES, AND COMPUTER PROGRAM PRODUCTS FOR SYNCHRONIZED CONVERSATION BETWEEN CO-LOCATED DEVICES

(71) Applicant: Nokia Technologies Oy, Espoo (FI)

(72) Inventor: Apaar Tuli, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 434 days.

(21) Appl. No.: 13/680,213

(22) Filed: Nov. 19, 2012

(65) Prior Publication Data

US 2014/0143445 A1    May 22, 2014

(51) Int. Cl.
    *G06F 15/16*      (2006.01)
    *G06F 15/173*     (2006.01)
    *G06Q 10/10*      (2012.01)

(52) U.S. Cl.
    CPC ....... *G06F 15/17325* (2013.01); *G06Q 10/10* (2013.01)

(58) Field of Classification Search
    CPC .......................... G06F 15/17325; G06Q 10/10
    USPC ........ 709/201–203, 217–219, 232, 248, 206, 709/223
    See application file for complete search history.

(56) References Cited

U.S. PATENT DOCUMENTS

| | | | |
|---|---|---|---|
| 6,089,942 A | | 7/2000 | Chan |
| 6,286,033 B1 * | | 9/2001 | Kishinsky et al. ........... 709/203 |
| 7,696,718 B2 * | | 4/2010 | Suzuki .......................... 320/108 |
| 10,664,217 B1 * | | 5/2020 | Laha ...................... G06F 3/1423 |
| 2003/0125057 A1 * | | 7/2003 | Pesola ............... G06F 17/30174 455/502 |
| 2003/0162556 A1 * | | 8/2003 | Libes .................. H04W 76/023 455/507 |

(Continued)

FOREIGN PATENT DOCUMENTS

| | | |
|---|---|---|
| EP | 1 131 959 | 9/2001 |
| GB | 2 394 843 A | 5/2004 |

(Continued)

OTHER PUBLICATIONS

Kortuem, Gerd, Christian Kray, and Hans Gellersen. "Sensing and visualizing spatial relations of mobile devices." In Proceedings of the 18th annual ACM symposium on User interface software and technology, pp. 93-102. ACM, 2005.*

(Continued)

*Primary Examiner* — Liang Che A Wang
(74) *Attorney, Agent, or Firm* — Alston & Bird LLP

(57) ABSTRACT

Methods, apparatuses, and computer program products are herein provided for synchronized conversation between co-located devices. A method may include determining that a first device and a second device are co-located. The method may further include causing a first script to be provided to the first device. The method may further include causing a second script to be provided to the second device. The method may further include causing synchronization between the first script and the second script so as to present a conversation between the first device and the second device in an instance in which the first device performs the first script and the second device performs the second script. Corresponding apparatuses and computer program products are also provided.

22 Claims, 10 Drawing Sheets

(56) References Cited

U.S. PATENT DOCUMENTS

| | | | |
|---|---|---|---|
| 2005/0198029 A1* | 9/2005 | Pohja et al. ........................ 707/8 |
| 2006/0194589 A1* | 8/2006 | Sankisa ................ H04W 88/02 |
| | | | 455/456.1 |
| 2006/0198296 A1* | 9/2006 | Majee ...................... H04L 1/24 |
| | | | 370/216 |
| 2007/0186007 A1 | 8/2007 | Field et al. |
| 2008/0182591 A1* | 7/2008 | Krikorian ............. H04W 68/00 |
| | | | 455/456.3 |
| 2008/0227393 A1* | 9/2008 | Tang .................... H04W 8/005 |
| | | | 455/41.3 |
| 2010/0061294 A1 | 3/2010 | Proctor, Jr. et al. |
| 2010/0063867 A1* | 3/2010 | Proctor, Jr. ........ G06Q 30/0623 |
| | | | 455/414.1 |
| 2010/0165965 A1* | 7/2010 | Carlton et al. ................ 370/338 |
| 2010/0279768 A1* | 11/2010 | Huang .................... A63F 13/12 |
| | | | 463/31 |
| 2010/0293598 A1* | 11/2010 | Collart .................. H04H 20/38 |
| | | | 726/3 |
| 2011/0111696 A1* | 5/2011 | Lazaridis ..................... 455/41.2 |
| 2011/0136431 A1 | 6/2011 | Haaromo et al. |
| 2011/0143632 A1 | 6/2011 | Lin et al. |
| 2011/0159813 A1* | 6/2011 | Mallinson ........... H04M 1/7253 |
| | | | 455/41.2 |
| 2011/0314167 A1* | 12/2011 | King ....................... H04L 67/14 |
| | | | 709/228 |
| 2012/0050153 A1 | 3/2012 | Dvortsov et al. |
| 2012/0128172 A1* | 5/2012 | Alden ................ H04L 63/0492 |
| | | | 381/77 |
| 2013/0071096 A1* | 3/2013 | Kiura ....................... H04N 5/93 |
| | | | 386/353 |
| 2013/0318158 A1* | 11/2013 | Teng ....................... H04L 67/42 |
| | | | 709/203 |
| 2014/0056172 A1* | 2/2014 | Lee ........................ H04W 4/70 |
| | | | 370/254 |

FOREIGN PATENT DOCUMENTS

| | | |
|---|---|---|
| JP | H11207031 A | 8/1999 |
| JP | 2001030844 A | 2/2001 |
| JP | 2004-312694 | 11/2004 |
| JP | 2007-295208 | 11/2007 |
| JP | 2008-276529 | 11/2008 |
| JP | 2008-279529 | 11/2008 |
| JP | 2009-214235 | 9/2009 |
| JP | 2009-236934 | 10/2009 |
| WO | WO 99/04514 A1 | 1/1999 |
| WO | WO-2011/054075 A1 | 5/2011 |

OTHER PUBLICATIONS

International Search Report and Written Opinion for Application No. PCT/FI2013/051050; dated Feb. 5, 2014.
Role of Internet Protocol in the World of Network Device dated Jun. 21, 2012 [online] [retrieved Dec. 4, 2012]. Retrieved from the internet: <URL: http://blogmillennialnet.com/2012/06/21/role-of-internet-protocol-in-the-world-of-network-devices/>. 2 pages.
Siri Greater than Iris dated Nov. 6, 2011 [online] [retrieved Dec. 4, 2012]. Retrieved from the internet: <URL: http://www.youtube.com/watch?v=xuEttr3-wmM>. 2 pages.
Office Action for Japanese Application No. 2015-542325 dated Aug. 19, 2016.
Decision of Final Rejection for Japanese Patent Application No. 2015-542325 dated May 18, 2017, with English translation, 2 pages.
Office Action for European Application No. 13795280.0 dated Jun. 12, 2017, 5 pages.
Office Action for European Application No. EP 13 795 280.0 dated Dec. 4, 2018, 5 pages.
Office Action for Japanese Application No. 2017-131962 dated Mar. 26, 2019, 2 pages.
Office Action for Japanese Application No. 2017-131962 dated Jun. 21, 2019.
Office Action for Japanese Application No. 2017-131962 dated May 1, 2018, 5 pages.

* cited by examiner

METHODS, APPARATUSES, AND COMPUTER PROGRAM PRODUCTS FOR SYNCHRONIZED CONVERSATION BETWEEN CO-LOCATED DEVICES

TECHNOLOGICAL FIELD

An example embodiment of the present invention relates generally to user interface technology and, more particularly, relates to methods, apparatuses, and computer program products for synchronized conversation between co-located devices.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Increased functionality in mobile computing devices has led to increasing use and, therefore, an increasing number of mobile computing devices worldwide. Indeed, often a single user (or a household of users) may own multiple mobile computing devices. Along these lines, in some cases, more than one mobile computing device may be located proximate to each other such that they are considered to be co-located (e.g., from the perspective of a network).

An example of such co-location of more than one mobile computing device may include the positioning of the mobile computing devices on a specific table in a house. Such a situation may occur, for example, when the mobile computing devices are charging. Additionally, in some cases, more than one mobile computing device may be charging on a single charging plate.

Some embodiments of the present invention seek to take advantage of the situation when more than one mobile computing devices are co-located and cause a conversation between the mobile computing devices to occur to provide ambient information to one or more listeners. In such a regard, the conversation may be synchronized between the two or more mobile computing devices for the enjoyment of the user/listener. The conversation may provide information to any listener, such as an event that occurred on one or more of the mobile computing devices, weather information, social media feeds, battery status, etc. In such a way, a useful and interesting experience may be presented to the listener by simply positioning two or more mobile computing devices proximate each other. In some cases, additional factors may be used to trigger the conversation (e.g., the mobile computing devices are charging, the mobile computing devices are in a certain location, etc.).

As such, embodiments of the present invention provide for synchronized conversation between co-located devices. In one example embodiment, a method includes determining that a first device and a second device are co-located. The method further includes causing a first script to be provided to the first device. The method further includes causing a second script to be provided to the second device. The method further includes causing synchronization between the first script and the second script so as to present a conversation between the first device and the second device in an instance in which the first device performs the first script and the second device performs the second script.

In some embodiments, the method further includes determining that at least one triggering event has occurred. The triggering event may comprise at least one of: the first device and the second device are charging; the first device and the second device have a pre-defined orientation; the first device and the second device are in a pre-determined location; it is a pre-determined time of day; the second device is within a pre-determined proximity of the first device; or the first device detects a pre-determined period of silence.

In some embodiments, the method includes causing the first script to be provided to the first device by causing a first pre-determined script to be provided to the first device. Additionally, in some embodiments, the method includes causing the second script to be provided to the second device by causing a second pre-determined script to be provided to the second device.

In some embodiments, the method may further include determining the first script based on data associated with the first device. Additionally, in some embodiments, the data associated with the first device may comprise at least one of: a social media feed; weather information; an event that occurred on the first device; or a battery status.

In some embodiments, the method may further include determining the second script based on data associated with the second device. In some embodiments, the data associated with the second device may comprise at least one of: a social media feed; weather information; an event that occurred on the second device; or a battery status.

In some embodiments, the method may comprise causing synchronization between the first script and the second script by causing the first device and the second device to synchronize the first script and the second script so as to present a conversation between the first device and the second device in an instance in which the first device performs the first script and the second device performs the second script.

In another example embodiment, a method includes receiving an indication that a first device and a second device are co-located. The method further includes determining a first script on the first device. The method further includes causing the first script to be presented in synchronization with a second script of the second device so as to present a conversation between the first device and the second device in an instance in which the first device performs the first script and the second device performs the second script.

In some embodiments, the method further includes determining that at least one triggering event has occurred. The triggering event may comprise at least one of: the first device and the second device are charging; the first device and the second device have a pre-defined orientation; the first device and the second device are in a pre-determined location; it is a pre-determined time of day; the second device is within a pre-determined proximity of the first device; or the first device detects a pre-determined period of silence.

In some embodiments, the method further includes determining the first script based on data associated with the first device. In some embodiments, the data associated with the first device may comprise at least one of: a social media feed; weather information; an event that occurred on the first device; or a battery status.

In another example embodiment, an apparatus comprises at least one processor and at least one memory storing computer program code with the at least one memory and stored computer program code being configured, with the at least one processor, to cause the apparatus to determine that a first device and a second device are co-located. The at least one memory and stored computer program code are configured, with the at least one processor, to further cause the apparatus to cause a first script to be provided to the first device. The at least one memory and stored computer program code are configured, with the at least one processor, to further cause the apparatus to cause a second script to be provided to the second device. The at least one memory and stored computer program code are configured, with the at least one processor, to further cause the apparatus to cause synchronization between the first script and the second script so as to present a conversation between the first device and the second device in an instance in which the first device performs the first script and the second device performs the second script.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising determining that a first device and a second device are co-located. The method further includes causing a first script to be provided to the first device. The method further includes causing a second script to be provided to the second device. The method further includes causing synchronization between the first script and the second script so as to present a conversation between the first device and the second device in an instance in which the first device performs the first script and the second device performs the second script.

In another example embodiment, an apparatus is provided. The apparatus comprises means for determining that a first device and a second device are co-located. The apparatus further comprises means for causing a first script to be provided to the first device. The apparatus further comprises means for causing a second script to be provided to the second device. The apparatus further comprises means for causing synchronization between the first script and the second script so as to present a conversation between the first device and the second device in an instance in which the first device performs the first script and the second device performs the second script.

BRIEF DESCRIPTION OF THE DRAWINGS

Figure 1:
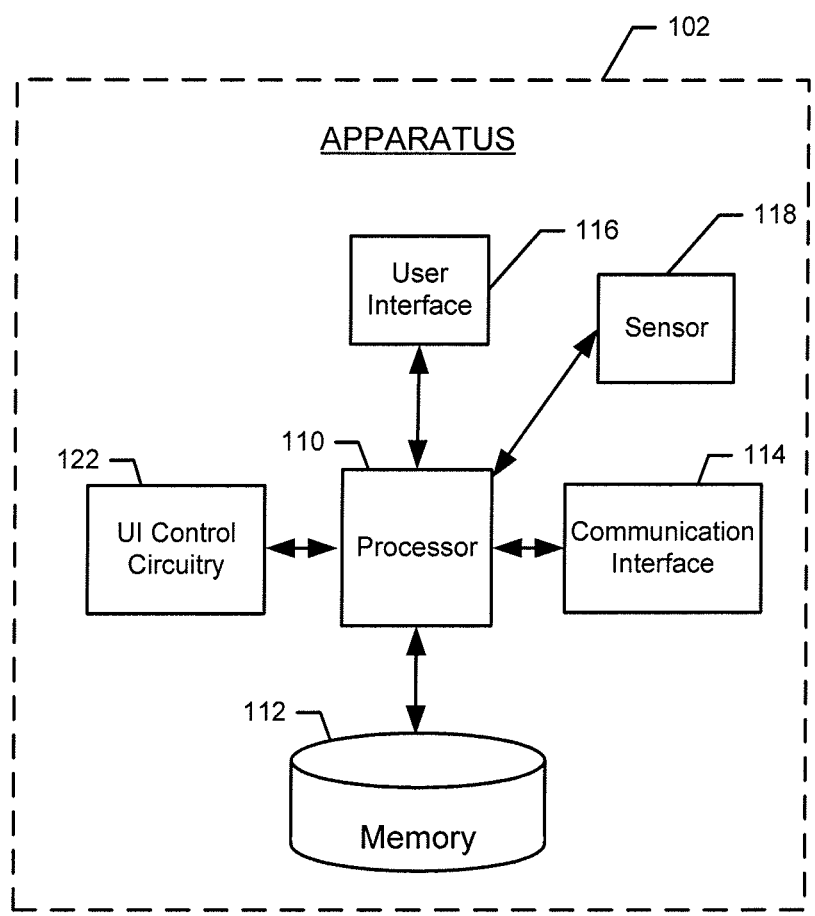
Figure 2:
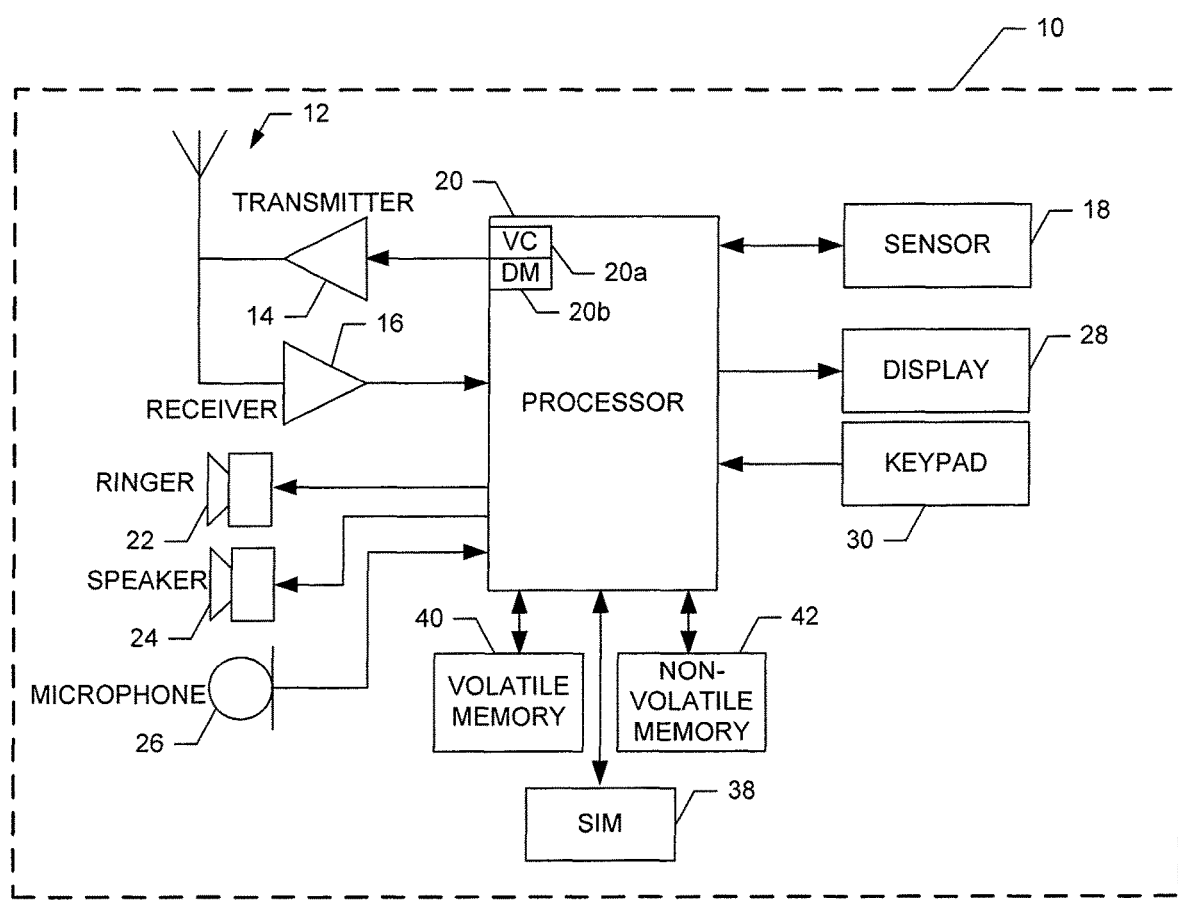
Figure 3:
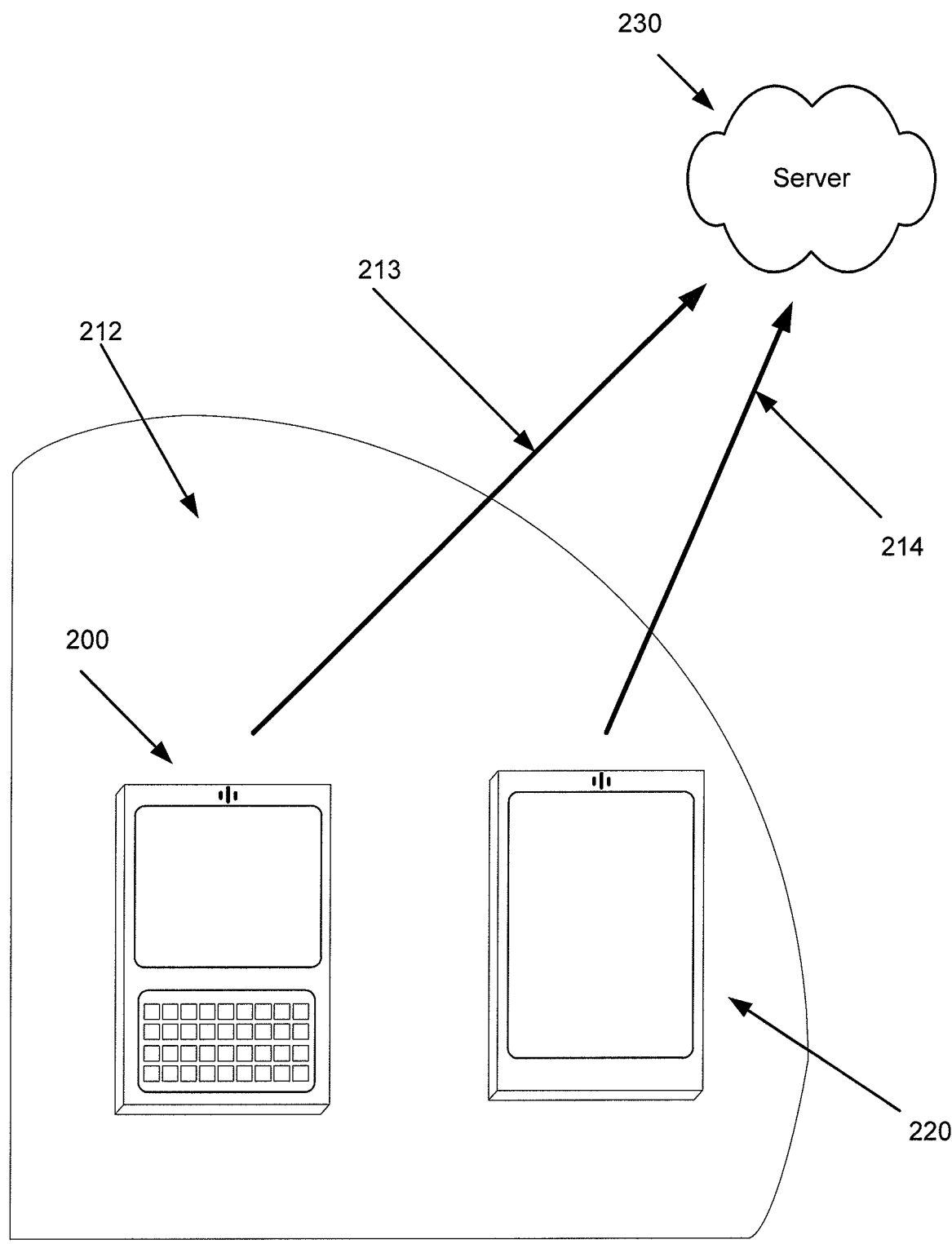
Figure 4:
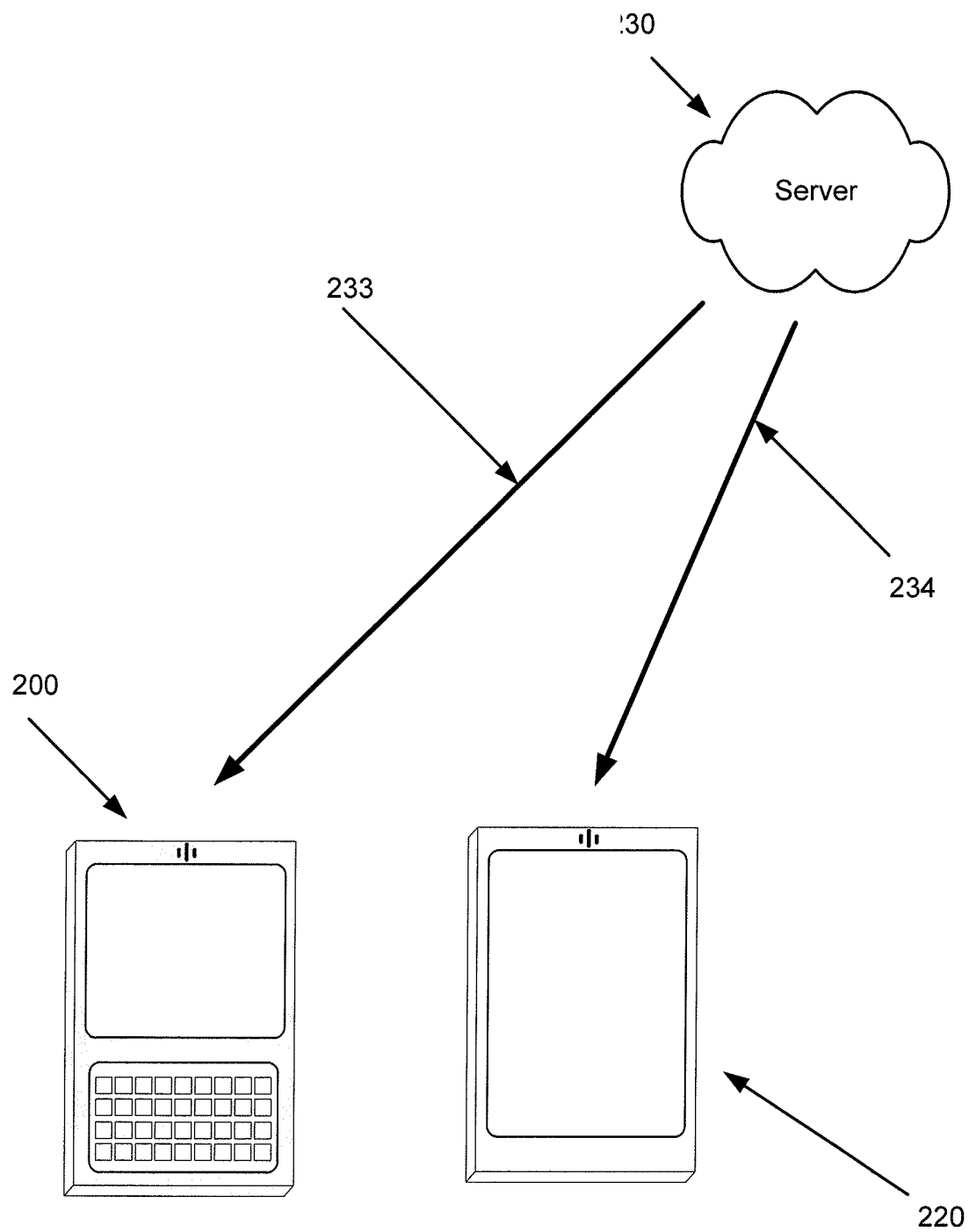
Figure 5:
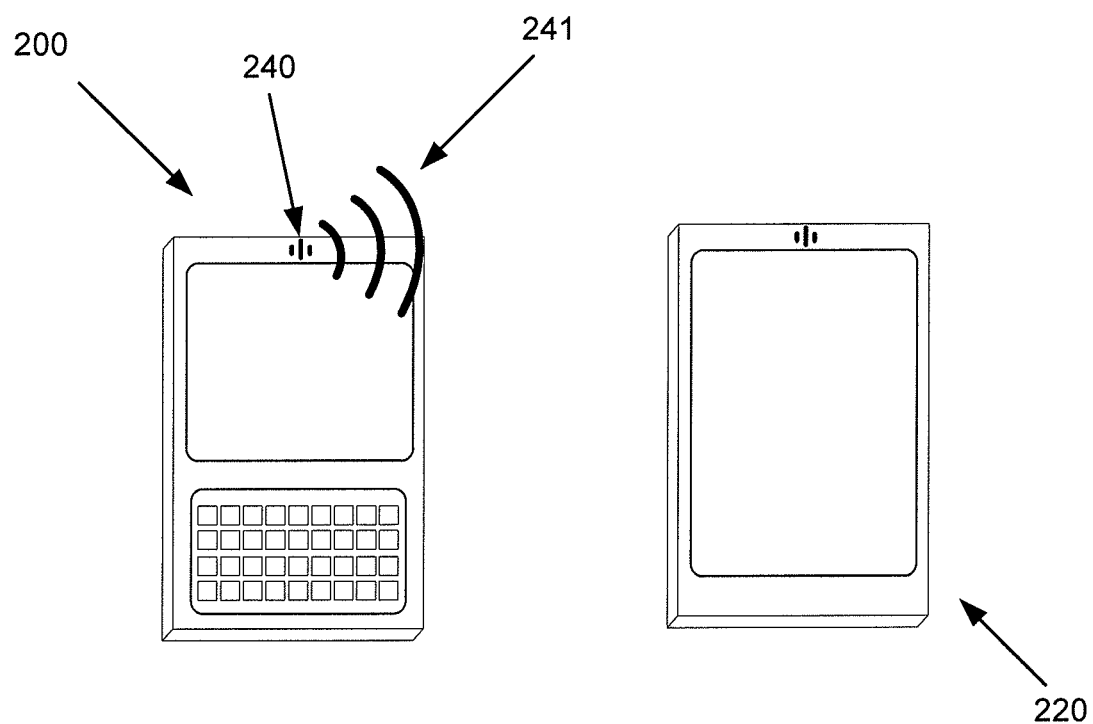
Figure 6:
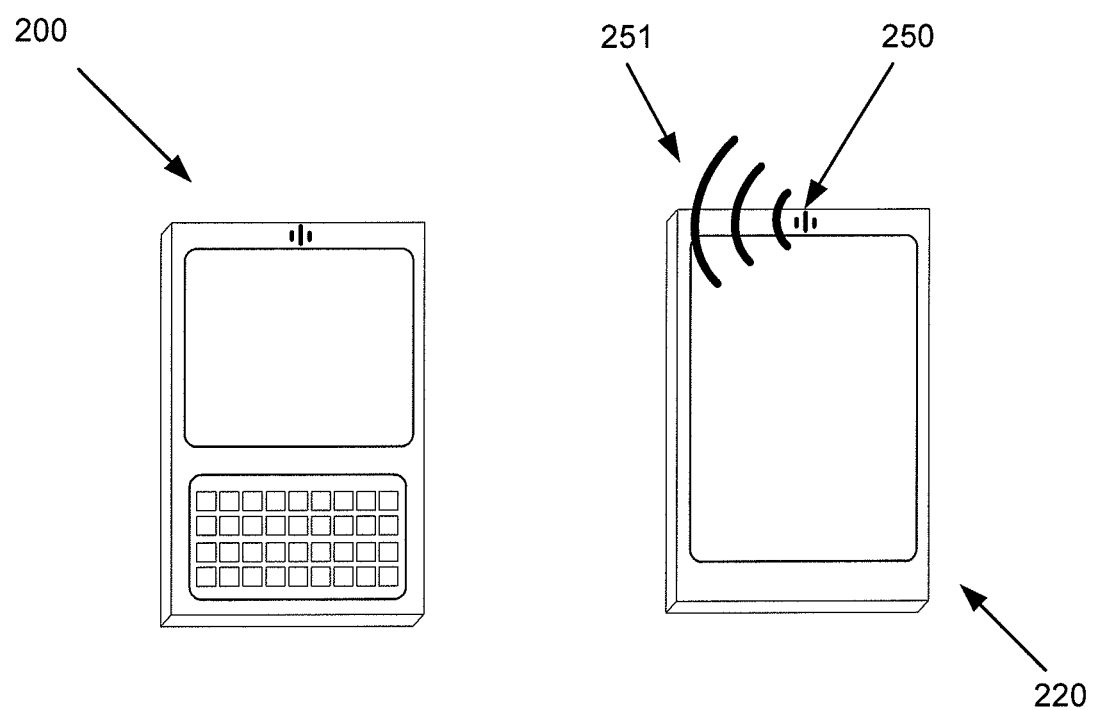
Figure 7:
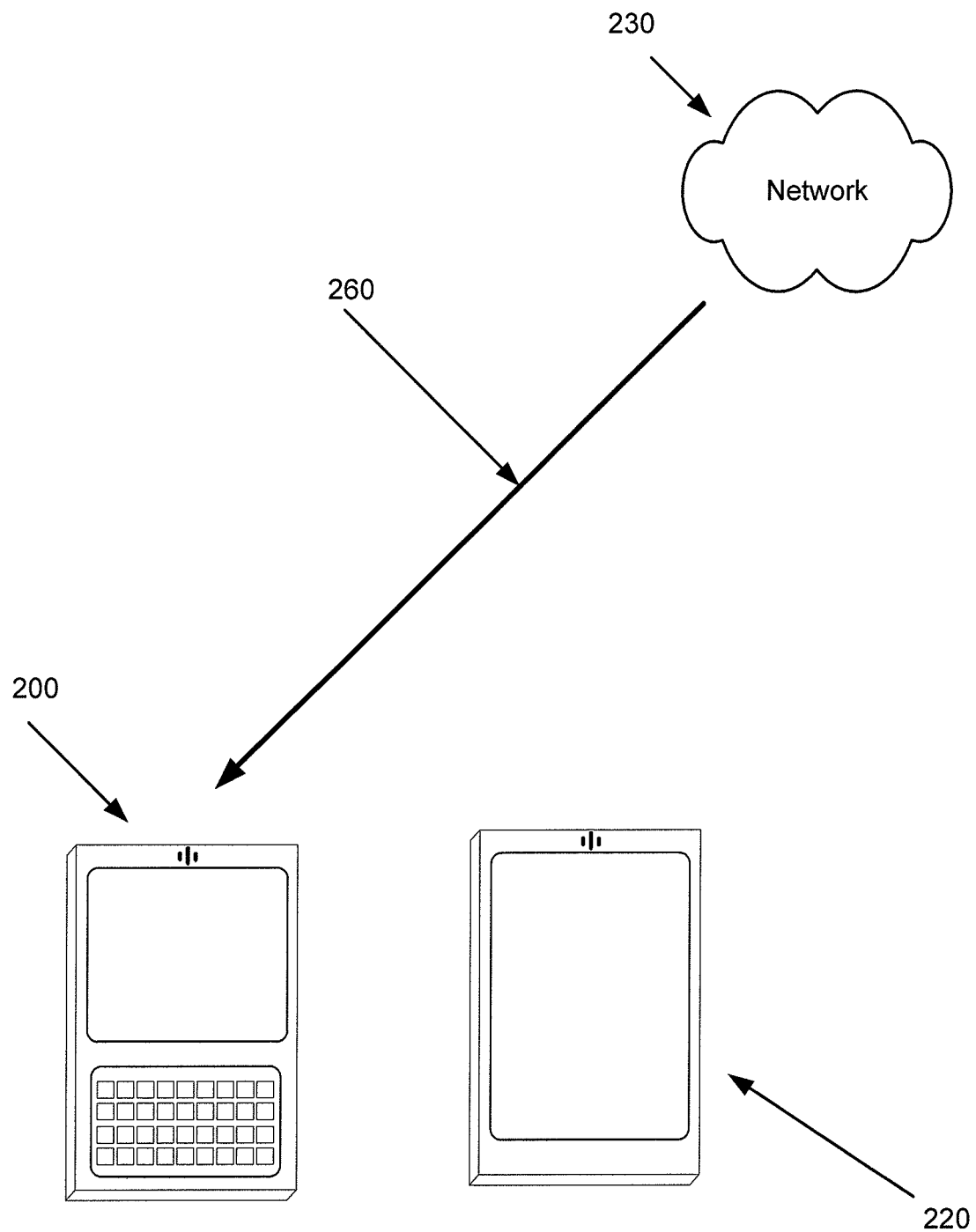
Figure 8:
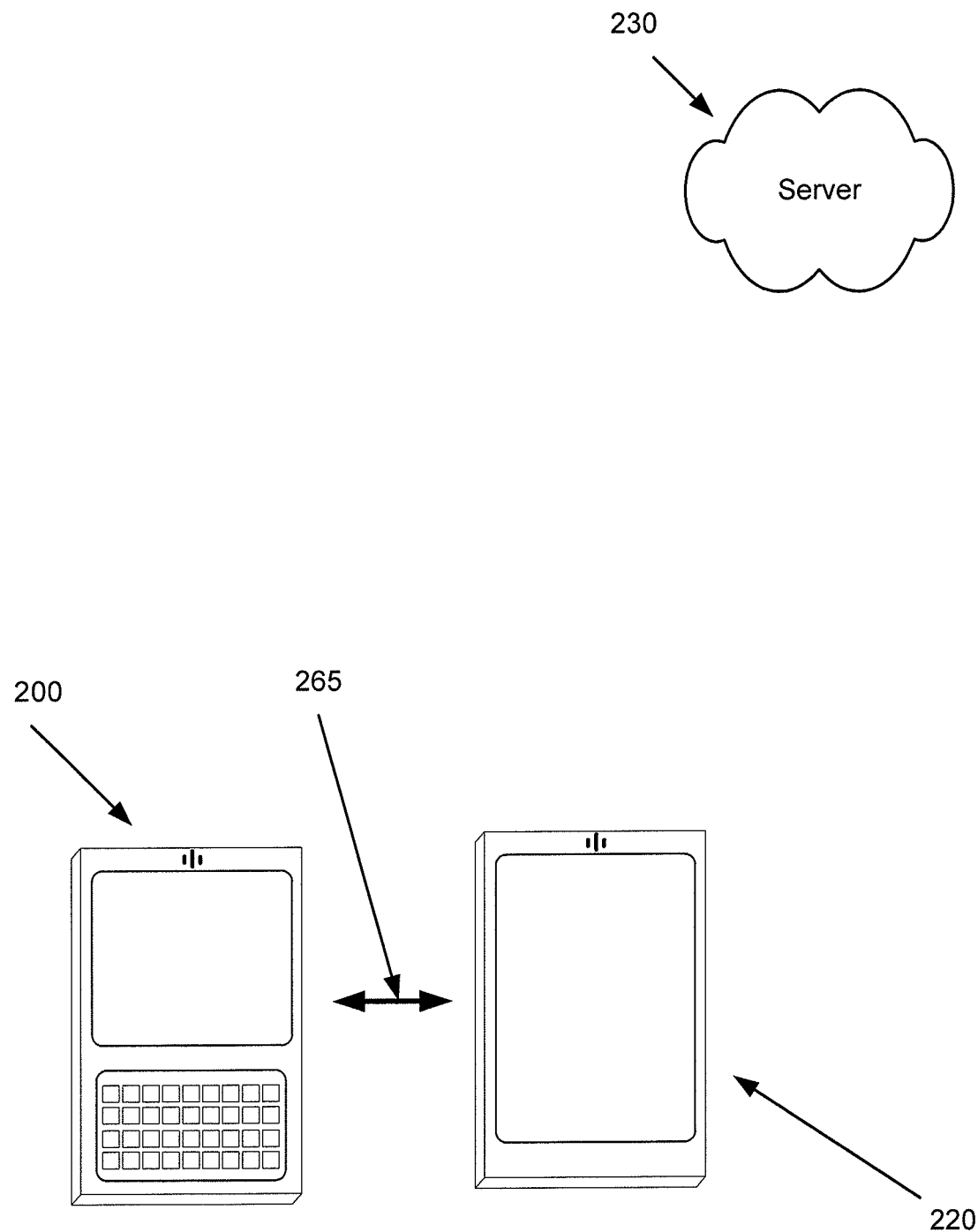
Figure 9:
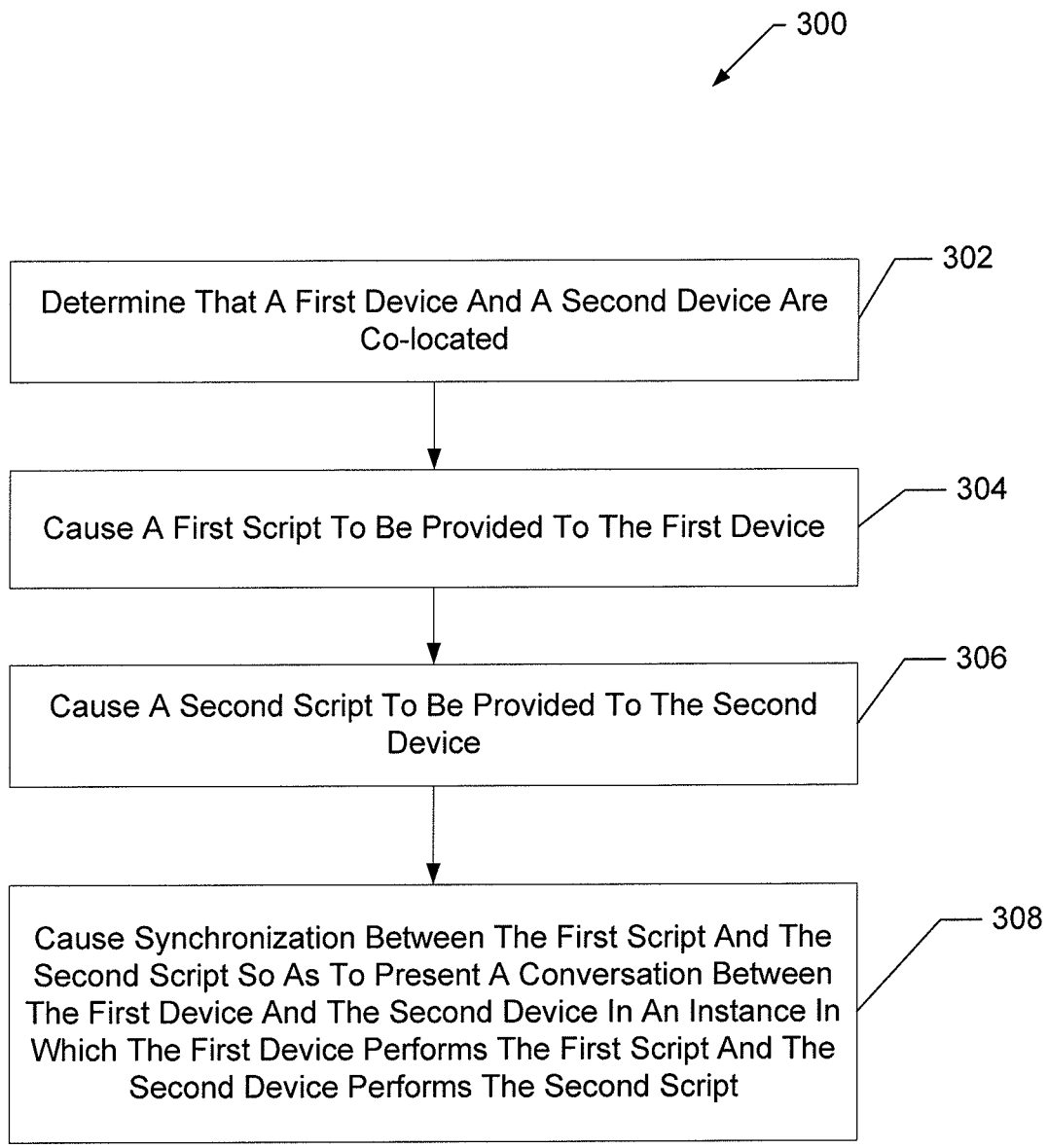
Figure 10:
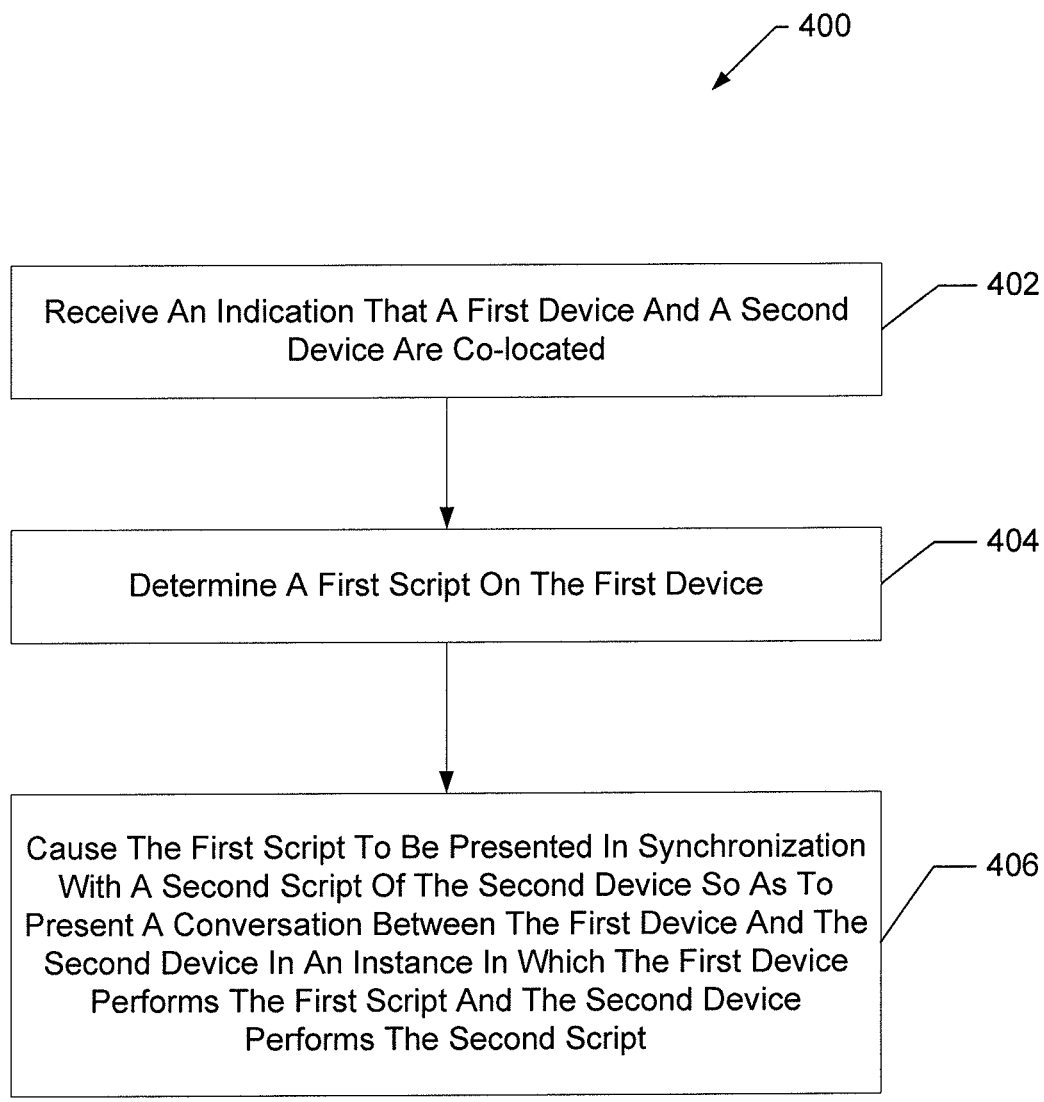

Having thus described some embodiments of the invention in general terms, reference will now be made to the accompanying drawings, which are not necessarily drawn to scale, and wherein:

FIG. 1 illustrates a block diagram of an apparatus with functional capabilities for synchronized conversation between co-located devices according to an example embodiment of the present invention;

FIG. 2 is a schematic block diagram of a mobile terminal according to an example embodiment of the present invention;

FIG. 3 illustrates an example environment of a server that may embody, for example, the apparatus shown in FIG. 1, wherein a first device and a second device are co-located, in accordance with an example embodiment of the present invention described herein;

FIG. 4 illustrates the environment shown in FIG. 3, wherein the server is transmitting a signal to the first device and the second device, in accordance with an example embodiment of the present invention described herein;

FIG. 5 illustrates a portion of the environment shown in FIG. 3, wherein the first device is performing a portion of a first script, in accordance with an example embodiment of the present invention described herein;

FIG. 6 illustrates a portion of the environment shown in FIG. 3, wherein the second device is performing a portion of a second script, in accordance with an example embodiment of the present invention described herein;

FIG. 7 illustrates an example environment of a first device that may embody, for example, the apparatus shown in FIG. 1, wherein the first device and a second device are co-located, in accordance with an example embodiment of the present invention described herein;

FIG. 8 illustrates the environment shown in FIG. 7, wherein the first device is communicating with the second device, in accordance with an example embodiment of the present invention described herein;

FIG. 9 illustrates a flowchart according to an example method for synchronized conversation between co-located devices, in accordance with an example embodiment of the present invention described herein; and FIG. 10 illustrates a flowchart according to another example method for synchronized conversation between co-located devices, in accordance with example embodiments of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include manmade transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for synchronized conversation between co-located devices according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for synchronized conversation between co-located devices, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a server, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, sensor 18, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, sensor 18, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The sensor 118 may be in communication with the processor 110 and/or UI control circuitry 122. The sensor 118 may be configured to sense and/or detect input. In embodiments wherein the apparatus 102 is embodied as a mobile terminal 10, the sensor 118 may be embodied as or comprise the sensor 18 (shown in FIG. 2). In some embodiments, the processor 110 and/or UI control circuitry 122 may be configured to receive input from the sensor 118 and determine that at least one other apparatus (e.g., a second device) is proximate the apparatus 102. In some embodiments, the processor 110 and/or UI control circuitry 122 may be configured to receive input from the sensor 118 and determine the orientation of either the apparatus 102 or at least one other apparatus (e.g., a second device) relative to the apparatus 102. In some embodiments, the sensor 118 may comprise a proximity sensor and/or light sensor. Still further, the sensor 118 may include an orientation sensor, such as a gyroscope, a compass or the like, for determining the relative orientation of the apparatus 102 or the device embodying the apparatus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

As used herein, the apparatus 102 may comprise at least either a device (e.g., devices 200, 220 shown in FIG. 3) or a server (e.g., as server 230 shown in FIG. 3). Indeed, though some example embodiments are described herein from the perspective of a server embodying the apparatus 102, some embodiments of the present invention contemplate similar examples from the perspective of a device embodying the apparatus 102. Similarly, though some example embodiments are described herein from the perspective of a device embodying the apparatus 102, some embodiments of the present invention contemplate similar examples from the perspective of a server embodying the apparatus 102.

In some embodiments, the apparatus 102, such as through the processor 110, may be configured to determine the relative position of other devices. In some embodiments, the apparatus 102 may be configured to determine an instance in which at least one other device is positioned proximate to the apparatus 102. For example, in some embodiments, the apparatus 102 may be configured to receive an indication that at least one other device is proximate the apparatus 102. In this regard, the apparatus 102 may be configured to transmit signals to and/or receive signals from other devices, such as through a proximity-based communications, e.g., Wi-Fi, NFC, BlueTooth, Wi-MAX, etc. In such a manner, the apparatus 102 may be configured to recognize the proximate nature of other devices based on the ability to transmit signals to and/or receive signals from the other devices, such as by recognizing signals having a strength and/or a quality that satisfy respective thresholds as being proximate the apparatus.

In some embodiments, the apparatus 102, such as through the processor 110, may be configured to determine relative distance of the other devices. For example, the apparatus 102 may be configured to determine the distance between the first device embodying the apparatus 102 and the other devices based on characteristics of the signal (e.g., time traveled, signal strength, signal quality, etc.) with distances less than a predefined threshold being considered proximate one another. In some embodiments, each other device may transmit a position signal to the apparatus 102. The position signal may provide the specific location of the other device such that the apparatus 102 may determine the relative position of the other device with the other device being considered proximate in instances in which the relative position satisfies a predefined positional relationship. Additionally or alternatively, the apparatus 102 may be configured to sense the presence of another device, such as through a sensor (e.g., sensor 118), with another device being considered proximate if the presence of the other device is sensed. While certain embodiments of techniques for determining the proximity of devices are described, other techniques may be employed by other embodiments of the present invention.

In some embodiments, the apparatus 102, such as through the processor 110, may be able to determine that more than one devices are proximate each other. In some embodiments, each device may transmit a signal to the apparatus 102 indicating its position. Along these lines, the apparatus 102, such as through the processor 110, may be configured to determine that two or more devices are proximate each other. Additionally or alternatively, in some embodiments, such as those described above, a first device may determine that it is proximate a second device and may communicate such to the apparatus 102.

In some embodiments, the apparatus 102, such as through the processor 110, may be configured to determine that a first device and a second device are co-located. Two or more devices may be co-located when they are determined to be approximately in the same location (e.g., position) from the perspective of apparatus 102. For example, in some embodiments, a first device and second device may be considered to be co-located when they are proximate to each other, such that they are within a pre-determined distance from each other. As noted herein, embodiments of the present invention are not meant to be limited to two devices being co-located and may be applied to more than two devices being co-located.

Such an example of co-location is illustrated in FIG. 3. In the depicted embodiment, a server 230 may embody the apparatus 102 and may determine that a first device 200 and a second device 220 are co-located. For example, the server 230 may receive an indication (e.g., signal 213) of a location of the first device 200. Likewise, the server 230 may receive an indication (e.g., signal 214) of a location of the second device 220. Based on the location of the first device 200 and the location of the second device 220, the server 230 may determine that the first device 200 and second device 220 are co-located. For example, the server 230 may determine that the first device 200 is proximate the second device 220, such as that they may be within a certain radius of each other (e.g., area 212, which extends from the first device 200).

In some embodiments, the determination of whether a first device and second device are co-located may not be based on a pre-determined distance and may vary depending on the specific circumstance. Alternatively, in some embodiments, the determination as to whether two devices are proximate may be based on a pre-defined distance (e.g., 5 ft., 6 in., etc.) and/or signal strength. As noted above, proximity and/or distance may not be the only determination as to whether a first device and a second device are co-located, as, in some cases, other factors may determine co-location.

In some embodiments, the apparatus 102, may be embodied as part of a charging plate and may be configured, such as through the processor 110, to determine that one or more devices are co-located on the charging plate. For example, the apparatus 102 embodied in a charging plate may be configured to determine proximity information such as through Bluetooth low-energy (BTLE) allowing the charging plate to detect one or more devices in close proximity to the charging plate. The charging plate may also be configured to determine that one or more devices are charging through the charging plate, based on power consumption for example.

In some embodiments, the apparatus 102, such as through the communication interface 114, may be configured to cause a first script to be provided to the first device. The apparatus 102, in some embodiments, may be configured to cause the first script to be provided in any format to the first device (e.g., text-based format, text-to-speech based format, audio file format, etc.). For example, once the apparatus 102 determines that the first device and second device are co-located, the apparatus 102 may facilitate conversation between the first and second device. As such, the apparatus 102 may cause a first script for the conversation to be provided to the first device. For example, with reference to FIG. 4, the server 230 may transmit the first script (e.g., signal 233) to the first device 200.

In some embodiments, the apparatus 102, such as through the processor 110, may be configured to determine the first script. Additionally, in some embodiments, the apparatus 102, such as through the processor 110, may be configured to determine the first script based on data associated with the first device. In such a manner, the data may be stored such that the apparatus 102 may access it or, in some cases, the first device may be queried to provide such data to the apparatus 102 for determination of the first script. In some embodiments, the data associated with the first device may comprise at least one of: a social media feed; weather information; an event that occurred on the first device; or a battery status. Indeed, in some embodiments, such data may be related to anything with the first device, such as information related to the user of the first device. In such a manner, the corresponding conversation that is partially created by the first script may be dynamically created and may be pertinent or interesting to the user. In fact, it may provide additional, or different, notifications of important events. In such a manner the script for the conversation may provide a new surprise for the listener each time.

Though the above examples detail some data associated with the first device, some embodiments of the present invention contemplate any type of data associated with the first device. Likewise, the first script may, in some embodiments, not be limited to data associated with the first device, and may be created from any data (e.g., news articles, stock quotes, data associated with the second device, etc.).

In contrast, in some embodiments, the first script may be pre-determined. As such, in some embodiments, the apparatus 102, such as through the communication interface 114 and/or processor 110, may be configured to cause a first pre-determined script to be provided to the first device.

Though the above example embodiments, contemplate the third entity (e.g., the server 230 of FIG. 4) determining and/or providing the first script to the first device, in some embodiments, the first device may be configured to determine the first script. For example, the first device may be configured to determine the first script based on data associated with the first device. Likewise, the first device may be configured to determine a first pre-determined script.

In some embodiments, the apparatus 102, such as through the communication interface 114, may be configured to cause a second script to be provided to the second device. The apparatus 102, in some embodiments, may be configured to cause the second script to be provided in any format to the second device (e.g., text-based format, text-to-speech based format, audio file format, etc.). For example, once the apparatus 102 determines that the first device and second device are co-located, the apparatus 102 may facilitate conversation between the first and second device. As such, the apparatus 102 may cause a second script for the conversation to be provided to the second device. For example, with reference to FIG. 4, the server 230 may transmit (e.g., signal 234) the second script to the second device 220.

In some embodiments, the apparatus 102, such as through the processor 110, may be configured to determine the second script. Additionally, in some embodiments, the apparatus 102, such as through the processor 110, may be configured to determine the second script based on data associated with the second device. In such a manner, the data may be stored such that the apparatus 102 may access it or, in some cases, the second device may be queried to provide such data to the apparatus 102 for determination of the second script. In some embodiments, the data associated with the second device may comprise at least one of: a social media feed; weather information; an event that occurred on the second device; or a battery status. Indeed, in some embodiments, such data may be related to anything with the second device, such as information related to the user of the second device. In such a manner, the corresponding conversation that is partially created by the second script may be dynamically created and may be pertinent or interesting to the user. In fact, it may provide additional, or different, notifications of important events. In such a manner the script for the conversation may provide a new surprise for the listener each time.

Though the above examples detail some data associated with the second device, some embodiments of the present invention contemplate any type of data associated with the second device. Likewise, the second script may, in some embodiments, not be limited to data associated with the second device, and may be created from any data (e.g., news articles, stock quotes, data associated with the first device, etc.).

In contrast, in some embodiments, the second script may be pre-determined. As such, in some embodiments, the apparatus 102, such as through the communication interface 114 and/or processor 110, may be configured to cause a second pre-determined script to be provided to the second device.

Though the above described embodiment details the third entity (e.g., server 230 in FIG. 4) providing the second script to the second device, in some embodiments, the first device may be configured to provide the second script to the second device. Additionally, in some embodiments, the first device may be configured to determine the second script to provide to the second device. Additionally, in some cases, the first device may be configured to determine the second script based on data associated with at least one of the first device or the second device. Likewise, the first device may be configured to determine a second pre-determined script and provide it to the second device.

In some embodiments, the apparatus 102, such as through the processor 110 and/or communication interface 114, may be configured to cause synchronization between the first script and the second script so as to present a conversation between the first device and the second device in an instance in which the first device performs the first script and the second device performs the second script. Indeed, in some embodiments, the first script and the second script may be designed to form a conversation when performed by the first device and second device, respectively. Thus, in such a manner, the first device and second device may, in some embodiments, appear to a listener to be "talking" to each other. However, some embodiments of the present invention also contemplate a text-based conversation. Similarly, additional features may be used during the conversation so as to add further effect. For example, one or more of the devices may employ other functionality, such as display of lights or causing vibration, during the conversation. Along these lines, different "voices" can be used for performance of the script or portions of the script.

Synchronization of the first and second script to form a conversation may be performed in a number of different ways. For example, in some embodiments, each script may be divided into portions, such as conversation lines. Additionally, in some embodiments, the apparatus 102, such as through the processor 110, may be configured to determine time intervals for performance of each portion. Accordingly, in some embodiments, the apparatus 102 may be configured to instruct the first device to perform a first portion of the first script within a corresponding first time interval. Additionally, the apparatus 102 may be configured to instruct the second device to perform the first portion of the second script after the first time interval has passed. The second device may also be instructed to perform the first portion of the second script within a corresponding second time interval. Then, the first device may be instructed to perform the second portion of the first script after the second time interval elapses. In such a manner, performance of the first script by the first device and the second script by the second device presents a conversation to a listener. For example, with reference to FIG. 5, the first device 200 may perform a first portion of the first script, such as by transmitting a broadcast (e.g., sound waves 241) of the first portion of the first script from a speaker 240. Then, with reference to FIG. 6, the second device 220 may perform a first portion of the second script, such as by transmitting a broadcast (e.g., sound waves 251) of the first portion of the second script from a speaker 250.

Though the above example embodiment provides an example of time intervals being used to synchronize the conversation between the first device and second device, other methods are contemplated. For example, in some embodiments, the apparatus 102 may send an individual instruction signal for performance of each portion of the first and second script to the corresponding first or second device at the appropriate time to create synchronization of the performance accordingly.

In some embodiments, the apparatus 102 may be configured to cause synchronization between the first script and the second script by causing the first device and the second device to synchronize the first script and the second script so as to present a conversation between the first device and the second device in an instance in which the first device performs the first script and the second device performs the second script. For example, in some embodiments, the devices could listen to each other to determine when to perform the next portion of the script. Indeed, in some cases, the second device may be configured to listen to the broadcast of the first device, and after a certain amount of time of silence has elapsed, the second device may determine that it should perform the next portion of the second script. Likewise, the first device may be similarly configured.

Additionally or alternatively, in some embodiments, each device may send a signal to the other device after it has completed performing its portion of the first or second script respectively. As such, the device receiving the indication of completion may then perform the next portion to create a synchronized conversation.

Though some example embodiments used herein may describe the apparatus 102 being configured as a server for determining when a first device and second device are co-located, in other embodiments, the apparatus 102 may be the first device or second device. In such embodiments, the apparatus 102 may be embodied by the first device (e.g., the first device 200 shown in FIG. 7) that determines that the first device and second device are co-located. For example, the first device may determine that the second device is proximate the first device.

Additionally or alternatively, in some embodiments, the apparatus 102 may be configured to receive an indication that a first device and a second device are co-located. In such an embodiment, the apparatus 102 may be configured as the first device. For example, with reference to FIG. 7, a server 230 may determine that a first device 200 and a second device 220 are co-located. Then, the first device 200 (which may embody the apparatus 102) may receive an indication (e.g., signal 260) that the server 230 has determined that the first device 200 and second device 220 are co-located.

Additionally, as noted above, the apparatus 102 may be configured to determine a first script on the first device. Such determination, as described in greater detail above, may be pre-determined or, in some cases, may be determined based on data, such as data associated with the first device. Moreover, such data associated with the first device may comprise at least one of: a social media feed; weather information; an event that occurred on the first device; or a battery status. As such, the determination of the first script may include any of the above described embodiments.

Then, in some embodiments, the apparatus 102 may be configured to cause a second script to be provided to the second device. Such a second script, similar, to the first script, as described in greater detail above, may be pre-determined or, in some cases, may be determined based on data, such as data associated with the second device. Moreover, such data associated with the second device may comprise at least one of: a social media feed; weather information; an event that occurred on the second device; or a battery status. As such, the determination of the second script may include any of the above described embodiments.

Additionally, in some embodiments, the apparatus 102 may be configured to cause the first script to be presented in synchronization with a second script of the second device so as to present a conversation between the first device and the second device in an instance in which the first device performs the first script and the second device performs the second script. In such a regard, similar to the example embodiments described with respect to FIGS. 5 and 6, the apparatus 102 (as from the perspective of the first device) may also be configured to cause synchronization of the presentation of the first and second script between the first and second devices. For example, with reference to FIG. 8, the first device 200 may communicate (e.g., signal 265) with the second device 220 to cause synchronization of performance of the first script on the first device 200 and the second script on the second device 220.

Though the above described examples detail embodiments of the present invention from the perspective of first device, embodiments of the present invention are not meant to be limited to the perspective of the first device and contemplate utilization from the perspective of any device, including devices not even depicted (e.g., other network entities).

In some embodiments, the apparatus 102 may be configured to determine that at least one triggering event occurred. Such a triggering event, in some embodiments, may be needed to occur before the apparatus 102 causes the first script to be provided to the first device and the second script to be provided to the second device or, in some cases, prior to the apparatus 102 determining the first script. In such embodiments, additional triggering events may be needed to occur in order to initiate the conversation to take place between the first device and second device. Example triggering events include at least one of: the first device and the second device are charging; the first device and the second device have a pre-defined orientation; the first device and the second device are in a pre-determined location; it is a pre-determined time of day; the second device is within a pre-determined proximity of the first device; or the first device detects a pre-determined period of silence.

For example, the triggering event may require the first device and second device to be charging their respective batteries before a synchronized conversation is initiated. In some cases, the charging may occur on a charging plate or each device may be independently charged with separate wires or separate charging plates.

In another example embodiment, the triggering event may be that the first device and second device have established BTLE connections with a charging plate and the first device and second device are charging their respective batteries through the charging plate. In such an embodiment, the apparatus 102 embodied in the charging plate may be configured to then cause a first or second script to be provided to the first device or second device, through BTLE for example, and coordinate the conversation.

In another example embodiment, the triggering event may be that one of the first device or second device is determined to have a pre-defined orientation. For example, in some embodiments, as noted above, each apparatus 102 (e.g., each device), such as through the sensor 118, may be configured to determine its orientation (e.g., the device is lying flat, the device is upside down, etc.). As such, the triggering event may require one or more of the devices to have pre-defined orientation, such both devices must be lying flat.

In another example embodiment, the triggering event may be based on the orientation of a device on a charging plate. For example, in some embodiments, a device may determine its orientation, such as through the sensor 118, relative to the charging plate before triggering initiation of a conversation. If a device is oriented face up on the charging plate, for example, it may be ready to initiate a conversation, while if the device is oriented face down on the charging plate it may not participate in any conversations.

In another example embodiment, the triggering event may be that the first device and second device are positioned in a certain location. For example, based on the location of each device, the apparatus 102 may determine that the first device and second device are located in a pre-determined location (e.g., a home office, bed side table, café, office, etc.) prior to initiating the conversation.

In another example embodiment, the triggering event may be that it is a pre-determined time of day. As such, the apparatus 102 may be configured to determine the time of day and/or day (e.g., 1 pm, morning, weekend, Tuesday, etc.) prior to initiating the conversation.

In another example embodiment, the triggering event may be that the second device is within a pre-determined proximity of the first device. As such, the apparatus 102 may be configured to determine a specific distance (e.g., 5 feet, 25 feet, 5 inches, etc.) that the first device has to be within with respect to the second device prior to initiating the conversation. Additionally, in some cases, each device may have a unique identifier, such that the triggering event may include a requirement that the second device be a specific device (e.g., a partner's device, a son's device, a friend's device, a co-worker's device, etc.).

In another example embodiment, the triggering event may be that the first device detects a pre-determined period of silence. As such, the apparatus 102 may be configured to determine (or cause one of the devices to determine) that a per-determined period of time of silence has elapsed (e.g., 1 minute, 5 minutes, 5 seconds, etc.) prior to initiating the conversation.

Though the above described embodiments include a list of example triggering events, some embodiments of the present invention contemplate any type of triggering event.

By assigning triggering events to initiate the conversation, further customization and dynamic features can be employed for example embodiments of the present invention. For example, utilizing such triggering events may further customize (or personalize) the occurrence of the conversations between the first and second device. In some embodiments, the triggering events may be pre-determined or, alternatively, the triggering events may be customizable, such as by user configuration.

In some embodiments, the apparatus 102 may be configured to determine the first and/or second script based on the triggering events. For example, if the triggering event includes the first and second device being positioned in a home office, the apparatus 102 may be configured to determine the first and/or second script based on data associated with a certain business (e.g., stock quotes). Along these lines, if the triggering event includes the first and second device charging, the apparatus 102 may be configured to determine the first and/or second script based on data associated with charging, such as the estimated time until the first and/or second device is fully charged. In such embodiments, contextual information may be used for creation of the synchronized conversations such that the conversations may be more pertinent and/or interesting to the listener.

In another example embodiment, two or more devices that are being charged on one or more charging plates in a same location may be configured to use a protocol to coordinate synchronized conversation between the two or more devices. For example, the two or more such apparatuses 102 (e.g. two or more such devices) may form a local network, such as through Bluetooth or similar awarenet type technology, or form an IP network to make each of the devices aware of the ability of the devices to participate in a conversation or provide unique information. For example, two such devices on one or more charging plates in a same location may form a network and may run a screen saver synchronized between the two devices such that text or an object could move between the device display screens. In a further example embodiment, device orientation, such as determined by a sensor 118, may be used to define how the synchronization between device display screens is performed.

Though example embodiments described herein detail a synchronized conversation between a first device and a second device, some embodiments of the present invention contemplate a synchronized conversation between any number of devices (e.g., three devices, five devices, etc.).

Embodiments of the present invention provide methods, apparatus and computer program products for synchronized conversation between co-located devices. Various examples of the operations performed in accordance with embodiments of the present invention will now be provided with reference to FIGS. 9-10.

FIG. 9 illustrates a flowchart according to an example method for synchronized conversation between co-located devices according to an example embodiment 300. The operations illustrated in and described with respect to FIG. 9 may, for example, be performed by, with the assistance of, and/or under the control of one or more of the processor 110, memory 112, communication interface 114, user interface 116, sensor 118, or UI control circuitry 122. Operation 302 may comprise determining that a first device and a second device are co-located. The processor 110, communication interface 114, and/or sensor 118 may, for example, provide means for performing operation 302. Operation 304 may comprise causing a first script to be provided to the first device. The processor 110 and/or communication interface 114 may, for example, provide means for performing operation 304. Operation 306 may comprise causing a second script to be provided to the second device. The processor 110 and/or communication interface 114 may, for example, provide means for performing operation 306. Operation 308 may comprise causing synchronization between the first script and the second script so as to present a conversation between the first device and the second device in an instance in which the first device performs the first script and the second device performs the second script. The processor 110 and/or communication interface 114 may, for example, provide means for performing operation 308.

FIG. 10 illustrates a flowchart according to another example method for synchronized conversation between co-located devices according to an example embodiment 400. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 402 may comprise receiving an indication that a first device and a second device are co-located. The processor 110, communication interface 114, and/or sensor 118 may, for example, provide means for performing operation 402. Operation 404 may comprise determining a first script on the first device. The processor 110 and/or communication interface 114 may, for example, provide means for performing operation 404. Operation 406 may comprise causing the first script to be presented in synchronization with a second script of the second device so as to present a conversation between the first device and the second device in an instance in which the first device performs the first script and the second device performs the second script. The processor 110 and/or communication interface 114 may, for example, provide means for performing operation 406.

FIGS. 9-10 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    determining, by a processor, that a first device and a second device are co-located;
    causing a first script to be provided to the first device;
    causing a second script to be provided to the second device; and
    in response to determining the first device and the second device are co-located based on at least one of (1) connectivity within a near field communication network, or (2) a determination that the first device and the second device are within a predetermined distance of each other, causing synchronization between the first script and the second script so as to present a conversation between the first device and the second device via respective user interfaces of the first device and the second device, wherein causing the synchronization causes at least:
    the first device to perform at least a first portion of the first script within a first time interval, the second device to perform at least a first portion of the second script within a second time interval, and the first device to perform at least a second portion of the first script after the second time interval elapses.

2. The method according to claim 1 further comprising determining that at least one triggering event has occurred, resulting in performance of another script, wherein the triggering event comprises at least one of:
    the first device and the second device are charging;
    the first device and the second device have a pre-defined orientation;
    the first device and the second device are in a pre-determined location;
    it is a pre-determined time of day;
    the first device detects a pre-determined period of silence.

3. The method according to claim 1 further comprising determining the first script based on data associated with the first device.

4. The method according to claim 3, wherein the data associated with the first device comprises at least one of: a social media feed; weather information; an event that occurred on the first device; or a battery status.

5. The method according to claim 1 further comprising determining the second script based on data associated with the second device.

6. The method according to claim 5, wherein the data associated with the second device comprises at least one of: a social media feed; weather information; an event that occurred on the second device; or a battery status.

7. The method according to claim 1, wherein the second time interval begins after the first time interval has elapsed.

8. The method according to claim 1 further comprising:
    causing the first device to perform at least a second portion of the first script after the second time interval has elapsed; and
    causing the second device to perform at least a second portion of the second script within a third time interval.

9. The method of claim 1, wherein the conversation presented via the respective user interfaces of the first device and the second device comprises an audible conversation.

10. An apparatus comprising a processor and a memory including computer program code, the memory and the computer program code configured to, with the processor, cause the apparatus to:
    determine that a first device and a second device are co-located;
    cause a first script to be provided to the first device;
    cause a second script to be provided to the second device; and
    in response to determining the first device and the second device are co-located based on at least one of (1) connectivity within a near field communication network, or (2) a determination that the first device and the second device are within a predetermined distance of each other, cause synchronization between the first script and the second script so as to present a conversation between the first device and the second device via respective user interfaces of the first device and the second device, wherein causing the synchronization causes at least:
    the first device to perform at least a portion of the first script within a first time interval, the second device to perform at least a first portion of the second script with a second time interval; and the first device to perform at least a second portion of the first script after the second time interval elapses.

11. The method of claim 1, wherein the conversation presented via the respective user interfaces of the first device and the second device comprises visual output.

12. The method of claim 1, wherein the conversation presented via the respective user interfaces of the first device and the second device comprises mechanical output.

13. A method comprising:
    receiving an indication that a first device and a second device are co-located;
    determining, by a processor, a first script on the first device; and in response to determining the first device and the second device are co-located based on at least one of (1) connectivity within a near field communication network, or (2) a determination that the first device and the second device are within a predetermined distance of each other, causing the first script to be presented in synchronization with a second script of the second device so as to present a conversation between the first device and the second device via respective user interfaces of the first device and the second device, wherein causing the synchronization causes at least:

the first device to performs at least a first portion of the first script within a first time interval, the second device to perform at least a first portion of the second script within a second time interval and, the first device to perform at least a second portion of the first script after the second time interval elapses.

14. The method according to claim 13 further comprising determining that at least one triggering event has occurred, resulting in performance of another script, wherein the triggering event comprises at least one of:
the first device and the second device are charging;
the first device and the second device have a pre-defined orientation;
the first device and the second device are in a pre-determined location;
it is a pre-determined time of day; or
the first device detects a pre-determined period of silence.

15. The method according to claim 13 further comprising determining the first script based on data associated with the first device.

16. The method according to claim 15, wherein the data associated with the first device comprises at least one of: a social media feed; weather information; an event that occurred on the first device; or a battery status.

17. The apparatus of claim 10, wherein the conversation presented via the respective user interfaces of the first device and the second device comprises an audible conversation.

18. The apparatus of claim 10, wherein the memory and the computer program code are further configured to, with the processor, cause the apparatus to determine that at least one triggering event has occurred, resulting in performance of another script, wherein the triggering event comprises at least one of:
the first device and the second device are charging;
the first device and the second device have a pre-defined orientation;
the first device and the second device are in a pre-determined location;
it is a pre-determined time of day; or
the first device detects a pre-determined period of silence.

19. The apparatus of claim 10, wherein causing the first script to be provided to the first device comprises causing a first pre-determined script to be provided to the first device.

20. The apparatus of claim 10, wherein the memory and the computer program code are further configured to, with the processor, cause the apparatus to determine the first script based on data associated with the first device.

21. The apparatus of claim 20, wherein the data associated with the first device comprises at least one of: a social media feed; weather information; an event that occurred on the first device; or a battery status.

22. Computer program product comprising a non-transitory computer readable medium having program code portions stored thereon, the program code portions being a computer readable medium and configured when said program product is run on a computer or network device, to:
determine that a first device and a second device are co-located;
cause a first script to be provided to the first device;
cause a second script to be provided to the second device; and
in response to determining the first device and the second device are co-located based on at least one of (1) connectivity within a near field communication network, or (2) a determination that the first device and the second device are within a predetermined distance of each other, cause synchronization between the first script and the second script so as to present a conversation between the first device and the second device via respective user interfaces of the first device and the second device, wherein causing the synchronization causes at least:
the first device to perform at least a first portion of the first script within a first time interval, the second device to perform at least a first portion of the second script within a second time interval and the first device to perform at least a second portion of the first script after the second time interval elapses.

* * * * *

UNITED STATES PATENT AND TRADEMARK OFFICE
CERTIFICATE OF CORRECTION

| | | |
|---|---|---|
| PATENT NO. | : 10,929,336 B2 | Page 1 of 1 |
| APPLICATION NO. | : 13/680213 | |
| DATED | : February 23, 2021 | |
| INVENTOR(S) | : Tuli | |

It is certified that error appears in the above-identified patent and that said Letters Patent is hereby corrected as shown below:

In the Claims

Column 22,
Line 3, "time of day;" should read --time of day; or--.

Column 23,
Line 12, "performs" should read --perform--.

Signed and Sealed this
Twenty-fourth Day of October, 2023

Katherine Kelly Vidal
*Director of the United States Patent and Trademark Office*